April 29, 1952     G. H. POHM     2,595,099
ELECTRIC CONTROL APPARATUS
Filed Oct. 14, 1947
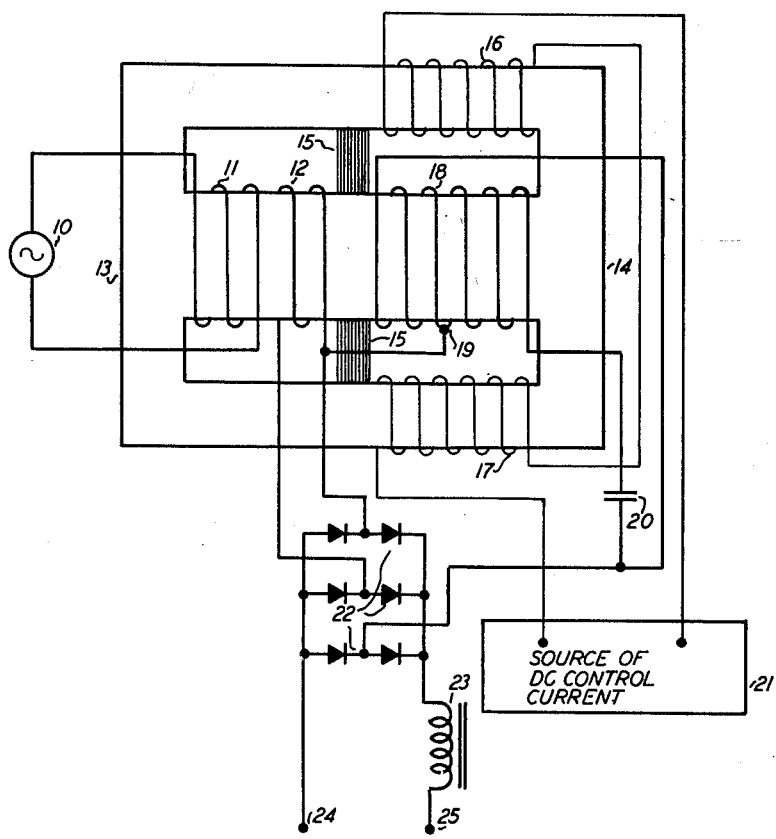
INVENTOR.
GEORGE H. POHM
BY *Hoodling and Krost*
ATTORNEYS.

Patented Apr. 29, 1952

2,595,099

UNITED STATES PATENT OFFICE 2,595,099

ELECTRIC CONTROL APPARATUS

George H. Pohm, Lorain, Ohio, assignor to Lorain Products Corporation, a corporation of Ohio Application October 14, 1947, Serial No. 779,707

3 Claims. (Cl. 321—5)

This invention deals with electric control apparatus and in particular with a system for regulating and controlling the output of a rectifier by means of a D. C. control current of relatively small magnitude.

An object of this invention is to provide a regulated rectifying system whose output can be controlled or reduced by the application of a unidirectional current.

Another object of this invention is to cut off or substantially reduce the output of a regulated rectifying system in response to a signal current applied to the system.

A further object of my invention is to supply a set of rectifiers from a leakage-reactance type transformer having a saturable core, and to control the output voltage of the rectifiers by impressing a unidirectional flux on the saturable core.

A still further object of my invention is to regulate the output of a rectifier by supplying it from a leakage-reactance transformer having a saturable core, and to provide the transformer with direct current winding means in conjugate relationship to the alternating current windings on the transformer, whereby a unidirectional control current may be employed to further control the output of the rectifier.

Other objects and a better understanding of my invention may be obtained from the following specification and claims together with the accompanying drawing which is a diagrammatic representation of an embodiment of my invention.

The rectifying system described herein is capable of supplying a closely regulated constant D. C. output voltage in spite of variations in the applied A. C. voltage and variations in the load. However, in the operation of a regulated rectifying system, it frequently becomes necessary to control the regulated output in response to one or more other factors, to make the rectifying system depart from its normal operation. For example, it is often necessary to provide temperature compensation in a regulated system, to compensate for variations in the regulating circuit and maintain a constant output voltage, or to compensate for temperature-responsive load changes and provide an output voltage which varies with temperature in a predetermined manner.

A need for a wider control range occurs when the device operated from the rectified current requires a reduced voltage at times. Thus, when a D. C. motor is to be operated from the output of the rectifiers, a reduction in voltage is required to prevent damage to the motor during the starting period or during an overload condition.

Similarly, the reduction in voltage may be brought into effect to protect the rectifiers themselves against damage resulting from overload currents.

In particular, my rectifying system is adapted to operate as a source of reference potential for a larger regulating system such as that shown in the patent application of H. M. Huge entitled, "Battery Charger," which is identified by Serial No. 780,408, filed October 17, 1947, and assigned to the same assignee. In this case it is required that the reference potential be reduced under overload conditions so that the maximum output current of the rectifying arrangement may be limited to a safe value.

Other uses for my invention will become apparent from the following detailed description of the embodiment thereof shown in the accompanying drawing.

The drawing shows diagrammatically a magnetic core structure having a primary portion 13 and a secondary portion 14. The secondary portion has three members, the central member carrying winding 18 and the two outer members carrying windings 16 and 17. Between the primary and secondary portions of the core, the magnetic shunt members 15 provide a leakage path for flux to thread the primary windings without threading the secondary, or vice versa. The leakage flux path has a relatively high reluctance and does not by-pass all of the primary flux away from the secondary but rather provides a controlled coupling between primary and secondary. The leakage flux path is magnetically in parallel with the secondary core portion, so that the primary flux can flow either through the secondary core portion or through the leakage flux path. In operation, part of the flux goes through each flux path.

The primary winding 11 on the primary core portion 13 is energized from the single-phase source of alternating current 10; the secondary winding 18 on the secondary core portion 14 has the capacitor 20 connected across it. An additional winding 12 inductively coupled to the primary winding 11 is connected to one phase of the three-phase rectifiers 22. The tap 19 on the secondary winding 18 is connected to one end of winding 12 and the end of the winding 18 is connected to the rectifiers 22 providing the third wire for the three-phase rectifiers. The capacitor 20 connected across winding 18 causes capacitive current to flow through winding 18. The capacitor 20 thus provides magnetizing current for the secondary core portion 14, and causes this core portion to operate at a high flux density. The saturation of the secondary core portion causes the voltage across secondary winding 18 to remain relatively constant. When load is drawn from the rectifiers, a phase shift is produced between the voltage across the secondary winding 18 and the voltage across winding 12. The shift in phase causes a change to occur from single-phase rectification at light loads to polyphase rectification at heavy loads, whereby a voltage increase is obtained to compensate for the voltage drops in the circuit. I am thus able to maintain a constant rectified output voltage in spite of variations in the load current. Furthermore, the arrangement compensates for variations in the source voltage, so that a closely regulated output is obtained across terminals 24 and 25. The operation of this portion of the circuit is described in U. S. Patent 2,364,558, issued December 5, 1944, to C. P. Stocker.

By my invention I am not only able to maintain an accurately regulated output voltage at the D. C. output terminals but am also able to control the value of this voltage over a range of operating values. I am able to accomplish this by providing the transformer with control windings 16 and 17 which are on the outside legs of the secondary portion of the core structure. These two windings 16 and 17 are connected in series with each other and polarized so the voltage of the source frequency induced in winding 16 is substantially equal and opposite to that induced in winding 17. This voltage is therefore cancelled in the control circuit and a conjugate relationship is established between the direct current control windings 16 and 17 and the alternating current winding 18. I have found that by supplying a relatively small amount of control current to the windings 16 and 17, I am able to change the output voltage at the output terminals 24 and 25 and at the same time to maintain the regulating characteristics of the circuit. By supplying a larger value of controlling current to the windings 16 and 17, the output voltage may be reduced to a low value, considerably lower than the normal voltage, and under this condition the regulating properties of the circuit are altered. Thus by my invention I am able to obtain two different types of operation in the rectifying system, the first providing a closely regulated output voltage, the value of which may be varied by the application of a small value of control current to the control windings 16 and 17. The second type of operation being obtained by the application of a somewhat larger value of control current, in which case the output voltage is dropped well below its normal regulated value.

The nature of the D. C. control source 21 has not been shown in detail in the drawing, because the nature of this source depends upon the type of control which is required in service but may comprise a rectifier system wherein the output voltage of the system is responsive to a variable condition, such for example as temperature, or may comprise any electrical circuit in which the D. C. potential supplied at the output terminal is responsive to a variable condition. Thus, a variation in the voltage across the terminals of the source of D. C. control current when acting upon the windings 16 and 17 produces a variation in the voltage across terminals 24 and 25. It may be mentioned that when it is required to protect the rectifiers 22 against overloads, the source 21 may be interconnected with the output power circuit so that it responds to the current output of the system and thereby brings about a control to limit the current flowing through the rectifiers. In this case the source 21 must supply a large enough control current to depress the output voltage well below its normal range, so that in case of a low resistance load being connected across the terminals 24 and 25, the current through the rectifiers 22 can be limited to a safe value.

When temperature compensation is required, the source of control current 21 is a temperature responsive device supplying a small value of control current to the windings 16 and 17, to correct the output voltage to the desired level at the various temperatures encountered.

When the controlled rectifying system of my invention acts as the reference potential source of a larger rectifying system, the source of control current is responsive to the output current of the larger system, so that when an overload occurs, a control current is applied to the windings 16 and 17 to reduce the output voltage of the reference source.

The reduction of the output voltage in my rectifying system may be accomplished by a combination of several factors. First there is the increased saturation of the secondary core portion 14 produced by the direct current passed through the windings 16 and 17. There may also be a loading of the secondary produced by the second harmonic voltage induced in the windings 16 and 17 and applied to the D. C. source 21. This effect can be substantially eliminated by the provision of a very high impedance source 21 or by a very low impedance source. In case the source 21 has a high impedance to the second harmonic voltage impressed on it, no appreciable second harmonic power is consumed, and if the impedance is very low, there is again no appreciable consumption of second harmonic power, even though appreciable second harmonic current may flow. The saturation of the secondary core portion 14 tends to reduce the voltage across winding 18 and, therefore, the output voltage. This action is amplified by the action of capacitor 20; as the voltage falls across the capacitor 20 the capacitive exciting current also diminishes, and a cumulative or regenerative action is obtained which increases the sensitivity of the control.

When a relatively small value of control current is applied to the windings 16 and 17 it reduces the effective permeability of the secondary core section 14. This reduction in permeability acts very much the same as a reduction in the size of the capacitor 20 which would likewise reduce the output voltage without substantially altering the regulating properties of the circuit. I am therefore able to maintain a regulated output voltage and to control the level of the voltage by means of a very small control current from the source 21.

Another feature of my invention resides in the fact that the application of D. C. control current to the control windings does not cause the exciting current of the primary winding 11 to become execessive. This is accomplished by the arrangement shown, in which the leakage flux members 15 provide a path for the unidirectional flux which does not include the primary core section 13. At least a portion of this flux may therefore circulate through the two outer members of the secondary core section 14 and through the two shunt members 15 without saturating the primary core section 13.

It will be understood that the drawing is diagrammatic in nature, and not intended to represent the proportioning of the circuit parts or of the core members, and that the primary core section 13 may have an appreciably larger cross-sectional area than the secondary core portion 14. By this arrangement, the exciting current of the primary winding 11 may be rendered even less sensitive to changes in the direct current magnetization.

It should be mentioned that although I have used the terms "relatively large value of control current" and "relatively small value of control current" in my description, nevertheless, the amount of D. C. power which is required to exert a control over the rectifying system is extremely small and by suitable proportioning of the windings 16 and 17 in relation to the source 21, I am able to obtain a very sensitive means for controlling or effectively shutting down the output voltage of the rectifying system with the application of an extremely small amount of control energy. This is especially true because of the amplifying action of the capacitor 20 which has already been described. The reduction in the voltage across winding 18 caused by D. C. magnetization of the core is accentuated by the capacitor 20 which is maintaining the flux density in this portion of the core at its operating value. Any reduction in the voltage across winding 18 results in a corresponding reduction in the magnetizing current produced by capacitor 20, and an amplifying action is obtained.

Because of the high sensitivity of my device it may also be used to advantage as an amplifier, in which case the large amount of rectified output power is controlled by a small amount of power from source 21.

Although I have described my invention with a certain degree of particularity, it is understood that the present disclosure has been made only by way of example and that numerous changes in the details of construction and the combination and arrangement of parts may be resorted to without departing from the spirit and scope of my invention as hereinafter claimed.

I claim as my invention:

1. A rectifying arrangement comprising in combination, a polyphase rectifier having first, second and third input terminals, a leakage reactance transformer, a capacitor, said transformer having a central core member and two outer core members, two magnetic shunt means respectively between the central core member and the outer core members and dividing the magnetic core structure into primary and secondary core portions, a first winding on the central core member of the primary core portion adapted for connection to a source of single-phase alternating current, a second winding on the central core member of the secondary core portion and connected in a closed circuit with said capacitor, a third winding on the central core member of the primary core portion, a first energizing circuit connected to the first and second terminals of the rectifier and including said third winding, and a second energizing circuit connected to the first and third terminals of the rectifier and including a portion of the second winding, fourth and fifth windings respectively on the outer core members of the secondary core portion, said fourth and fifth windings being connected in series and adapted for connection with a source of unidirectional current for producing unidirectional flux in the secondary core portion.

2. A rectifying arrangement comprising in combination, a polyphase rectifier having first and second rectifying circuits, direct current output terminals common to both of said circuits, a leakage reactance transformer, a capacitor, said transformer having a primary core portion, a secondary core portion, and a leakage flux path for diverting primary core portion flux from said secondary core portion, first winding means having its turns on the primary core portion, means for energizing turns of said first winding means from a source of single-phase alternating current, circuit means for energizing the first rectifying circuit from turns of said first winding means, second winding means having its turns on the secondary core portion, circuit means for energizing the second rectifying circuit from turns of said second winding means, a closed circuit including said capacitor and turns of said second winding means, and third winding means on the secondary core portion in conjugate relationship with the second winding means, said third winding means adapted for connections to a source of unidirectional current for producing unidirectional reflux in the secondary core portion to control the voltage across said direct current output terminals.

3. A rectifying arrangement comprising in combination, a polyphase rectifier having direct current output terminals and first, second and third alternating current terminals, a leakage reactance transformer, a capacitor, said transformer having a primary core portion, a secondary core portion, and a leakage flux path for diverting primary core portion flux from said secondary core portion, first winding means having its turns on the primary core portion, means for energizing turns of said first winding means from a source of single-phase alternating current, circuit means for energizing the first and second alternating current terminals from turns of said first winding means, second winding means having its turns on the secondary core portion, circuit means for energizing the second and third alternating current terminals from turns of said second winding means, a closed circuit including said capacitor and turns of said second winding means, and third winding means on the secondary core portion in conjugate relationship with the second winding means, said third winding means adapted for connection to a source of unidirectional current for producing unidirectional flux in the secondary core portion to control the voltage across said direct current output terminals.

GEORGE H. POHM.

REFERENCES CITED

The following references are of record in the file of this patent:

UNITED STATES PATENTS

| Number | Name | Date |
| --- | --- | --- |
| 2,364,558 | Stocker | Dec. 5, 1944 |

FOREIGN PATENTS

| Number | Country | Date |
| --- | --- | --- |
| 546,976 | Great Britain | Aug. 7, 1942 |